United States Patent Office 3,769,203
Patented Oct. 30, 1973

3,769,203
THERMAL ENERGY CONTROL FOR A FCC SYSTEM
Wooyoung Lee, Westmont, and Vern W. Weekman, Cherry Hill, N.J., assignors to Mobil Oil Corporation
Filed June 21, 1971, Ser. No. 155,188
Int. Cl. C10g 13/18
U.S. Cl. 208—164
46 Claims

ABSTRACT OF THE DISCLOSURE

The specific disclosure provides for separate regenerator and reactor temperature controls for a fluid catalytic cracking process while maintaining a predetermined catalyst circulation rate. The controls provide for independent adjustment of the temperature of the feed stock oil for the reactor, and of the temperature of the oxygen-containing gas for the regenerator to maintain predetermined temperatures in the reactor and in the regenerator, respectively.

BACKGROUND OF THE INVENTION

Field of the invention

This invention relates to an improved method and apparatus for controlling a fluid catalytic cracking system. More specifically, the present invention relates to a method and an apparatus for controlling the thermal energy applied to a fluid catalytic cracking system.

DESCRIPTION OF THE PRIOR ART

Fluid catalytic cracking has been known and commercially employed for many years. In general, a fluid catalytic cracking system comprises a catalyst section wherein a reactor inlet line is charged with fresh feed which is usually preheated and at least one recycle stream. The charge stream picks up regenerated catalyst from a regenerated catalyst line or standpipe, and is passed into the reactor. Within the reactor, the catalyst is maintained in a dense phase which, with respect to its physical properties, acts much like a liquid. Products are removed from the reactor in the vapor phase and passed to a products recovery section comprising at least one main fractionator or distillation column for separation into desired products. Catalyst, which has been coked by the cracking reaction in the reactor, is continuously passed from the reactor by a spent catalyst transfer line to a regenerator. In the regenerator, the coke is burnt from the catalyst by contact with an oxygen-containing gas. Flue gas is passed from the regenerator, and the regenerated catalyst is recirculated to the reactor by the standpipe where it is picked up by the reactor charge stream. Typical fluid catalyst cracking systems are disclosed in U.S. Pats. Nos. 3,206,393 and 3,261,777.

The quantity of oxygen-containing gas for regeneration is an important control variable in that an excess of oxygen causes "afterburning" of carbon monoxide in the dilute phase of the regenerator which causes high temperatures. On the other hand, an insufficient amount of oxygen provides inadequate removal of the carbon from the catalyst and thus introduces a limiting feature to the entire fluid catalytic cracking process.

Conventional fluid catalytic cracking systems operate with adiabatic control schemes which adjust catalyst circulation rate to bring the system back into heat balance. Thus, if a new charge stock has a higher coking tendency, the control scheme will automatically slow down the circulation rate until that amount of carbon burning required for heat balance is again achieved. While such control schemes are adequate for regulating the system around a steady state operating point, the schemes may actually move the system in the wrong direction in terms of an optimal operating strategy. In general, higher catalyst circulation rates lead to higher profits. However, for higher coking charge stocks the control acts to slow the circulation rate to bring the unit back into heat balance, but in the wrong direction in terms of optimization.

Conversely, a coke-deficient situation arises when the combination of catalyst and oil does not produce enough coke to maintain the regenerator at a suitable temperature generated by the heat of combustion of the carbonaceous material deposited on the catalyst. As noted in U.S. Pat. No. 3,364,136, at column 6, the use of improved catalysts such as zeolite aluminosilicates which tend to low coke production in the reactor may cause such a coke deficiency.

When the coke production rate is not sufficient, additional energy must be supplied to the system to balance the heat requirements. As shown in U.S. Pat. No. 3,206,393, a feed stock preheater can be used to supply thermal energy to the system.

It is also known to add liquid or gaseous fuels to a regenerator to provide a source of thermal energy. However, such fuels may contain metals which could become deposited on the catalyst and thus act as a poison. Further, liquid fuels by locally contacting the catalyst may reach excessively high temperatures which are potentially harmful to the regenerator apparatus and/or the catalyst. The use of supplemental fuel for the regenerator also requires an increased source of oxygen or air blower capacity to support combustion of the supplemental fuels.

SUMMARY OF THE INVENTION

In accordance with the present invention, there is provided a method of controlling the operation of a reactor and a regenerator of a fluid catalytic cracking system. The method provides for maintaining a predetermined catalyst circulation rate, and separately and independently controlling the temperatures of the reactor and the regenerator to maintain predetermined reactor and regenerator temperatures.

In accordance with an aspect of the present invention, there is provided a method of controlling the operation of a reactor and a regenerator of a fluid catalytic system wherein a predetermined catalyst circulation rate to the reactor is maintained to provide a predetermined cracking severity in the reactor. An actual reactor temperature is compared with a predetermined reactor temperature to obtain a reactor temperature deviation, and the temperature of a hydrocarbon feed stream to the reactor is adjusted in a direction to reduce the reactor temperature deviation. Further, the method provides for comparing an actual regenerator temperature with a predetermined regenerator temperature to obtain a regenerator deviation, and adjusting the temperature of an oxygen-containing gas stream to the regenerator in a direction to reduce the regenerator temperature deviation. Alternatively, the regenerator temperature deviation can be reduced or eliminated by adjustment of the composition, e.g., end point, of a recycle oil, by adjustment of the amount of a high coke forming oil added to the hydrocarbon feed stream, by adjustment of the amount of hydrocarbons removed from the catalyst in the stripper portion of the reactor, and by changing the composition of the catalyst. In accordance with a specific embodiment, the predetermined cracking severity is maintained by providing a predetermined catalyst to oil ratio in the reactor at the predetermined reactor temperature.

In accordance with another aspect of the present invention, there is provided a system for controlling the catalyst section of a fluid catalytic cracking system comprising means for maintaining a predetermined catalyst circulation rate to the reactor to provide a predetermined cracking severity in the reactor. The system also includes means for comparing an actual reactor temperature with a predetermined reactor temperature to obtain a reactor temperature deviation, and means for adjusting the temperature of a hydrocarbon feed stream supplied to the reactor in a direction to reduce the reactor temperature deviation. The system additionally includes means for comparing an actual regenerator temperature with a predetermined regenerator temperature to obtain a regenerator temperature deviation, and means for adjusting the temperature of the regenerator in a direction to reduce the regenerator temperature deviation. In accordance with a specific embodiment, the predetermined cracking severity is a predetermined catalyst to oil ratio at the predetermined reactor temperature.

In accordance with still another aspect of the present invention, there is provided a method of controlling the operation of a reactor and a regenerator of a fluid catalytic system wherein the composition of the hydrocarbon feed stream to the reactor or the composition of the active catalyst is changed. In accordance with the method, a predetermined catalyst circulation rate, and predetermined reactor and regenerator temperatures are generated which provide a desired conversion level when operated on the changed stream or changed catalyst. The catalyst circulation rate is adjusted to the generated predetermined catalyst circulation rate. The actual reactor and regenerator temperatures are compared with the respective generated predetermined reactor and regenerator temperatures to obtain reactor and regenerator temperature deviations. The temperatures of the hydrocarbon feed stream and of the oxygen-containing gas stream are simultaneously adjusted in directions to reduce the reactor and regenerator temperature deviations. Alternatively, the regenerator temperature deviation can be reduced or eliminated by adjustment of the composition, e.g., end point, of a recycle oil, by adjustment of the amount of a high coke forming oil added to the hydrocarbon feed stream, by adjustment of the amount of hydrocarbons removed from the catalyst in the stripper portion of the reactor, and by changing the composition of the catalyst.

DESCRIPTION OF SPECIFIC EMBODIMENTS

Figure 1:
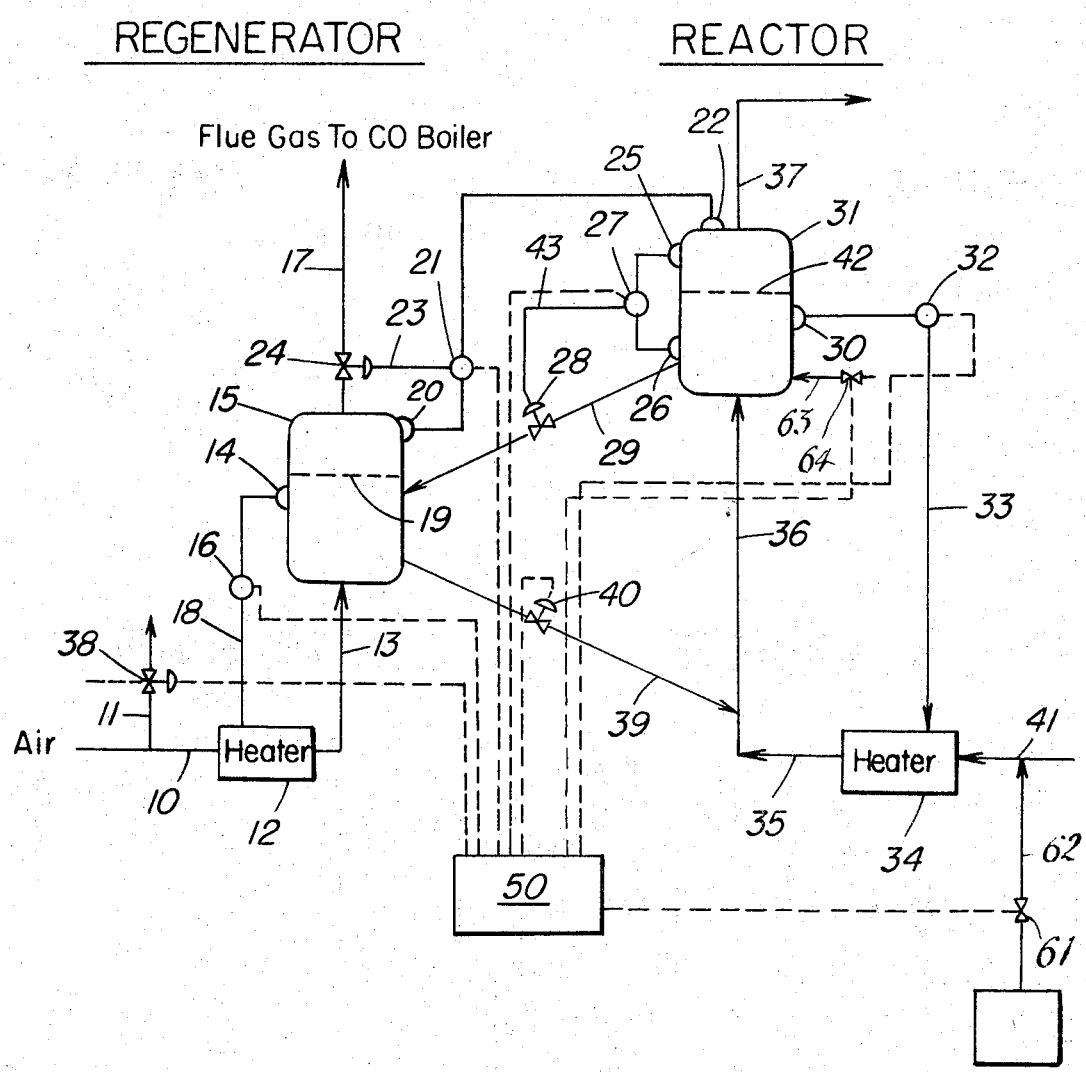
FIG. 1 is a schematic representation of a specific embodiment of the present invention.

FIG. 1 shows the essentials of a typical catalyst section control system wherein fresh hydrocarbon feed passes by a line 41 to a feed preheater 34. The preheater 34 provides a predetermined or controlled variable preheating to the feed stream and passes it by a line 35 to the lower end of a riser line 36. Heated catalyst from a standpipe 39 having a control valve 40 is combined with the heated oil in the riser line 36 such that an oil-catalyst mixture rises in an ascending dispersed stream to the lower end of a reactor 31. In the reactor 31, there may be further fluidized contacting between the oil and the catalyst particles within a relatively dense fluidized bed diagrammatically represented below the dash line 42. Generally, a major portion of the necessary cracking and contact of the oil with the catalyst takes place in the riser line 36.

At the upper end of the reactor 31, the catalyst particles are separated from the vaporous cracked reaction products by centrifugal or settler type separating means (not shown). Products are then transferred overhead by a line 37 to a products recovery section (not shown) which includes at least one fractionator. A stream of spent or coked catalyst is continuously passed from the reactor 31 to a regenerator 15 by a spent catalyst transfer line 29 having a control valve 28 such that the catalyst is transferred to the regenerator 15 at a controlled rate.

In the regenerator 15, the carbonized or coked catalyst particles are subjected to oxidation and carbon removal in the presence of air being introduced to the regenerator 15 by a line 13. The air is fed by a line 10 to a heater 12 prior to being introduced into the regenerator 15 by the line 13. A bypass line 11 having a control valve 38 is connected to the line 10 to vent a portion of the air being introduced into the system and thus regulate the quantity of air being introduced into the lower end of the regenerator 15.

In the lower portion of the regenerator 15, a fluidized dense phase bed diagrammatically represented as below the dash line 19 provides for contact between the coked catalyst particles and the oxidizing air stream. In the upper portion of the regenerator 15, a light phase zone permits the separation of catalyst particles by suitable centrifugal separating means (not shown) from a flue gas stream being discharged from the regenerator 15 by a line 17 having a control valve 24 therein. The line 17 vents the regenerator flue gas or feeds the flue gas to a carbon monoxide boiler (not shown) where the carbon monoxide is converted to carbon dioxide.

A level controller 27 is connected by level indicating taps 25, 26 to the side wall of the reactor 31. A control line 43 from the level controller 27 is connected to the slide valve 28 in the transfer line 29 to control the flow rate of catalyst through the transfer line 29. Thus, the dense phase bed level 42 and quantity of catalyst in the lower portion of the reactor 31 are maintained at desired values. The valve 40 in the standpipe 39 is set to provide a predetermined flow rate of catalyst particles from the lower portion of the regenerator 15 to the riser line 36.

A pressure sensitive means 22 is positioned in the upper portion of the reactor 31, and another pressure sensitive means 20 is positioned in the upper portion of the regenerator 15. The pressure sensitive means 20, 22 are connected to a differential pressure regulator 21 having an adjustable set point to maintain a desired differential pressure between the reactor 31 and the regenerator 15. The differential pressure regulator 21 is connected by a line 23 to the control valve 24 in the line 17 to regulate the flue gas flow through the line 17 and in turn vary the internal pressure within the upper portion of the regenerator 15 to thereby maintain a predetermined pressure difference between the reactor 31 and the regenerator 15. Generally, the pressure differential between the reactor 31 and the regenerator 15 is relatively low, for example in the order of about 6 p.s.i., and is necessary to permit the maintenance of suitable pressure differential across the slide valves 28, 40 in the spent catalyst transfer line 29 and the standpipe 39 to thus provide for a continuous circulation of catalyst particles between the reactor 31 and the regenerator 15.

Useful reaction conditions in fluid catalytic cracking include temperatures above 850° F., pressures from subatmospheric to approximately 10 atmospheres, catalyst to oil ratios of 1 to 30, oil contact time less than about 12–15 seconds in the riser line 36, preferably less than about 6 seconds where up to 95 percent of the desired conversion may be taking place in the riser line 36. Further, a useful catalyst residence or contact time is about 30 seconds to about 5 minutes in the dense bed 42 of the reactor 31.

In accordance with a specific embodiment of the present invention, the temperature of the feed stock in the line 35 and the temperature of the air in the line 13 are independently controlled to maintain a predetermined temperature in the reactor 31 and a predetermined temperature in the regenerator 15, respectively, while maintaining a predetermined catalyst circulation rate in the line 39 to provide a desired cracking severity in the reactor 31. An example of a cracking severity is a predetermined catalyst to oil ratio at the predetermined reactor temperature to provide a desired level of conversion in the reactor 31.

The valve 40 is positioned to provide a catalyst circulation rate to the reactor 31 to provide a desired catalyst to oil ratio in the riser line 36 and the reactor 31. Further, the set point of a temperature controller 32 is set to a predetermined reactor temperature which in combination with the desired catalyst to oil ratio provides a desired conversion level in the reactor. A temperature indicating means 30 is provided to sense the temperature of the dense bed in the reactor 31 and to provide a signal to the temperature controller 32 indicative of the temperature of the dense bed. When the temperature of the reactor dense bed deviates from the predetermined temperature as defined by the set point of the temperature controller 32, the temperature controller 32 applies a signal on a line 33 to adjust the heater 34 and thus adjust the temperature of the feed stream in the line 35 in a direction to reduce the deviation of the measured dense temperature and the predetermined temperature as defined by the set point of the temperature controller 32. Specifically, if the temperature generated by the indicating means 30 is above the predetermined temperature as determined by the set point of the temperature controller 32, the signal on the line 33 causes the heater to reduce the amount of heat applied to the feed stock stream in the line 35 to thereby reduce the temperature of the reactor dense bed. Conversely, when the temperature sensed by the indicating means 30 is below the predetermined temperature as defined by the set point of the temperature controller 32, the signal on the line 33 causes the heater 34 to increase the amount of heat applied to the feed stock stream in the line 35, and thus increase the temperature of the dense bed of the reactor 31.

The temperature of the regenerated catalyst flowing in the line 39 is also a source of thermal energy for the reactor 31. The temperature of the catalyst in the line 39 is maintained at a relatively constant level by maintaining the temperature in a dense bed of the regenerator 15 at predetermined level. A temperature indicating means 14 senses the temperature of the dense bed in the regenerator 15 and applies a signal indicative of regenerator dense bed temperature to a temperature controller 16. The temperature controller 16 has an adjustable set point which is positioned to generate a signal indicative of the predetermined regenerator dense bed temperature. When the regenerator dense bed temperature deviates from the predetermined regenerator dense bed temperature, the temperature controller applies a signal by a line 18 to the heater 12 to thereby adjust the temperature of the air in the line 13 in a direction to reduce the deviation. Specifically, when the temperature of the regenerator dense bed is above the predetermined regenerator dense bed temperature, the temperature controller 16 acts to decrease the amount of heat applied by the heater 12 to the air in the line 13 to thus reduce the temperature of the regenerator dense bed. Conversely, when the regenerator dense bed temperature is below the predetermined regenerator dense bed temperature, the temperature controller 16 causes the heater 12 to increase the amount of heat applied to the air in the line 13 to thereby increase the temperature of the regenerator dense bed.

The set points of the differential pressure controller 21, the level controller 27, and the temperature controllers 16, 32 can be manually adjustable to provide the predetermined temperatures in the regenerator 15 and in the reactor 31, and the predetermined catalyst circulation rate in the line 39 to maintain the predetermined cracking severity, or these set points can be adjusted in response to output control signals from a digital computer 50 as indicated by the dashed lines. The computer 50 can also control the setting of the valve 38 in the vent line 11 to determine the flow rate of air in the line 10 to the regenerator 15, and also control the slide valve 40 in line 39.

Independent adjustment of the regenerator 15 and the reactor 31 temperatures by separately controlling the air inlet temperature in the line 13 and the feed stock temperature in the line 35 permits the maintenance of a high catalyst circulation rate which is limited by the physical limitations of the reactor 31, the regenerator 15 and the catalyst carrying lines 29, 36, 39. A mathematical model of a fluid catalytic cracking (FCC) control system was prepared and implemented using digital simulation techniques. The model simulated conventional operation wherein the catalyst circulation rate is adjustable to maintain the system in heat balance, and simulated "decoupled" operation in accordance with the present invention wherein the temperatures of the regenerator and reactor are independently adjusted and the catalyst circulation rate is maintained at a specific value. The results of the simulations are shown in Table 1 for a high coke forming gas oil charge stock.

TABLE 1

FCC Product Yields by Decoupled and Conventional Operation on a[2] High Coke Forming Charge Stock

|  | Case A [1] | Δ yields case B − case A | Case B |
|---|---|---|---|
| Process variables: |  |  |  |
| Reactor mix temp., °F | 1,025 |  | 1,025 |
| Cat. circ. rate, T/M | 47.5 |  | 60 |
| Max. allowable cat. circ. rate, T/M | 60 |  | 60 |
| Oil to riser temp., °F | 447 |  | 201 |
| Reg. temp., °F | 1,259 |  | 1,275 |
| Coke on reg. cat., wt . percent | .16 |  | .16 |
| Air preheater, B.t.u./hr | 0 |  | 47MM |
| Product yields: |  |  |  |
| Gasoline, vol. percent | 46.48 | +1.96 | 48.44 |
| LFO, vol. percent | 23.73 | −1.81 | 21.92 |
| HFO, vol. percent | 11.80 | −3.39 | 8.41 |
| C₄⁻, vol. percent | 6.88 | +.48 | 7.36 |
| i-C₄, vol. percent | 3.54 | +.60 | 4.14 |
| n-C₄, vol. percent | 1.16 | +.23 | 1.39 |
| C₃⁻, vol. percent | 5.00 | +.63 | 5.63 |
| C₃, vol. percent | 2.40 | +.54 | 2.94 |
| C₂ + LTR. FOE | 3.70 | +.83 | 4.53 |
| Coke, wt. percent | 6.05 | +1.37 | 7.42 |

[1] Conventional operation, no feed preheater, no air preheater.
[2] Decoupled operation with feed preheater and air preheater.

The model simulated a fluid catalytic cracking system using a fluid zeolite crystalline aluminosilicate cracking catalyst, and having a capacity of 66,000 b./d. feed rate to the reactor, and a catalyst circulation rate capacity of 60 tons/min. Table 1 shows that conventional operation (case A) employs a catalyst circulation rate of 47.5 tons/min. for a high coke forming charge stock even though the FCC system could circulate 60 tons/min. The lower circulation rate is required to hold thhe reactor temperature at the maximum value permitted by metallurgical or fractionator heat removal constraints downstream from the reactor. However, the catalyst circulation rate is held at its maximum value with "decoupled" operation (case B) in accordance with the present invention.

Table 1 demonstrates that a low coke on regenerated catalyst of 0.16 wt. percent is maintained with "decoupled" operation by adding heat to the regenerator, lowering feed preheat and maintaining catalyst circulation rate at its maximum value. Residual carbon on the regenerated catalyst has an adverse effect on yields and catalyst activity, particularly when a zeolite catalyst is used. A gas oil was subjected to laboratory riser cracking runs with a regenerated equilibrium zeolite catalyst obtained from a commercial FCC system. The catalyst was regenerated in the laboratory to several lower residual carbon levels. The yields at several levels of residual carbon are summarized in Table 2.

TABLE 2

| Residual carbon | 0.00 | 0.05 | 0.10 | 0.15 | 0.20 | 0.25 |
|---|---|---|---|---|---|---|
| C/O, wt. basis | 10.2 | 10.5 | 10.8 | 11.0 | 11.2 | 11.4 |
| Temperature, °F | 960 | 960 | 960 | 960 | 960 | 960 |
| Conversion, percent vol | 68.5 | 67.0 | 65.5 | 63.7 | 61.8 | 59.5 |
| C₅⁺ gasoline, percent vol | 55.9 | 54.5 | 53.1 | 51.5 | 49.8 | 47.5 |
| Total C₄'s, percent vol | 12.2 | 11.6 | 11.0 | 10.3 | 9.5 | 8.9 |
| Dry gas, percent wt | 6.2 | 6.1 | 6.0 | 5.9 | 5.8 | 5.7 |
| Coke, percent wt | 6.0 | 6.0 | 6.0 | 6.0 | 6.0 | 6.0 |
| Gasoline efficiency, percent | 81.6 | 81.3 | 18.1 | 80.8 | 80.6 | 79.8 |

NOTE.—Yields are based on fresh feed and 390° F. at 90% gasoline.

Table 2 demonstrates the effect of residual carbon on FCC yields at constant coke of 6.0 wt. percent. The data of Table 2 show that in changing the residual carbon from 0.25 to 0%, conversion at constant coke is increased by about 9% volume. As a result of the improved efficiency of the catalyst, the gasoline yield is also increased by 8.4% volume.

Figure 2:
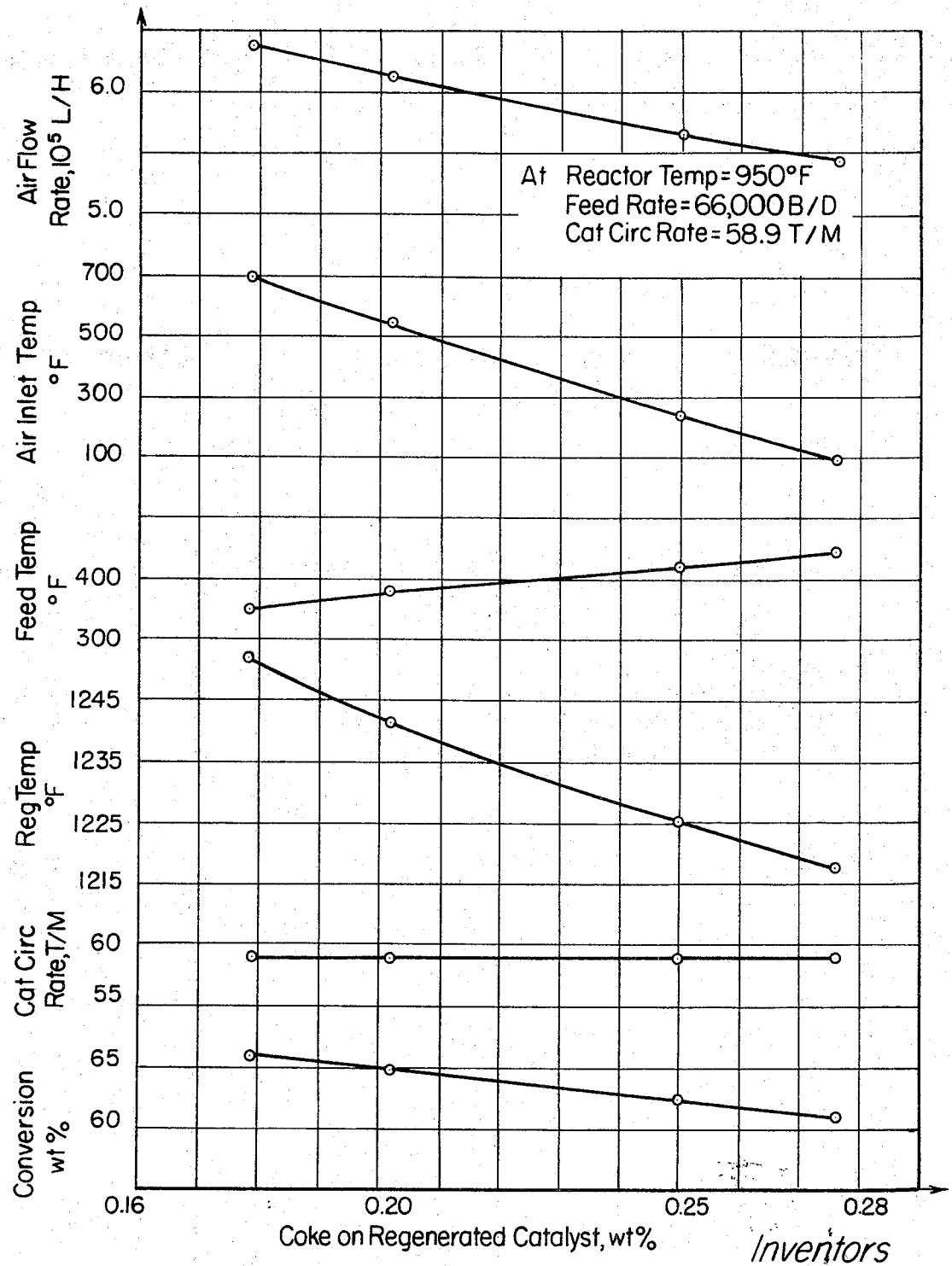
FIGS. 2–4 are graphs representative of data generated by simulation of catalyst section control systems.

A mathematical model of a fluid catalytic cracking system was implemented using digital simulation techniques for a "decoupled" control in accordance with the present invention. The simulation maintained a catalyst circulation rate of 58.9 tons/min. of an active zeolite crystalline aluminosilicate, and maintained a reactor temperature of 950° F. to provide a desired cracking severity as defined by the catalyst to oil ratio with a high coke forming gas oil charge stock feed rate of 66,000 b./d. The system simulated has a catalyst circulation rate maximum capacity of 60 tons/min. The results of this simulation are shown in the graphs of FIG. 2, and clearly demonstrate the advantages of "decoupled" operation in accordance with the invention to obtain the benefits of increased conversion by reducing the amount of coke on regenerated catalyst being fed to the reactor from the regenerator. The simulation data of FIG. 2 shows that an increase in air temperature of 600° F. and at simultaneous reduction of feed inlet temperature of 80° F. at a fixed catalyst circulation rate of 58.9 tons/min. reduced the amount of coke on the regenerated catalyst from approximately 0.276 wt. percent to approximately 0.179 wt. percent. This operation increased conversion by 5%.

As noted above, a coke-deficient situation arises when an insufficient amount of coke is produced in the reactor to provide heat balance between the reactor and regenerator. In addition to improved catalysts, a pretreated light oil feed stock, for example hydrogen treated gas oils, can also cause such a coke-deficiency. A coke-deficiency is therefore further compounded when improved lower coke producing catalysts are used in combination with a pretreated light oil feed stock. A conventional FCC control scheme would tend to increase catalyst circulation rate and/or reactor feed temperature to increase coke production rate. However, a high circulation rate acts to decrease the regenerator temperature with increasing coke on the generated catalyst. The catalyst activity for both the cracking and coke-forming reaction thus decreases. Further, the relatively light feed stock overcracks easily at high reactor temperatures to thus increase yields of gas products at the expense of more valuable gasolines. In general, the heat balance requirement in a coke-deficient situation dominates the selection of the operating conditions of a conventional FCC control scheme such that poor yields are produced.

"Decoupled" operation of a FCC system in accordance with the present invention is particularly effective to provide optimum operation in a coke-deficient situation. A mathematical model of a fluid catalytic cracking system was implemented using digital simulation techniques for a light gas oil of 28 API and a zeolite crystalline aluminosilicate. The computer simulations for the particular FCC system showed that the system should be operated at approximately 6 catalyst-to-oil ratio by weight, 935° F. reactor temperature, and 750° F. feed temperature to provide a reasonable conversion with a reasonably good selectivity. At these conditions, the conversion for the particular FCC system will be about 75% vol.

Figure 3:
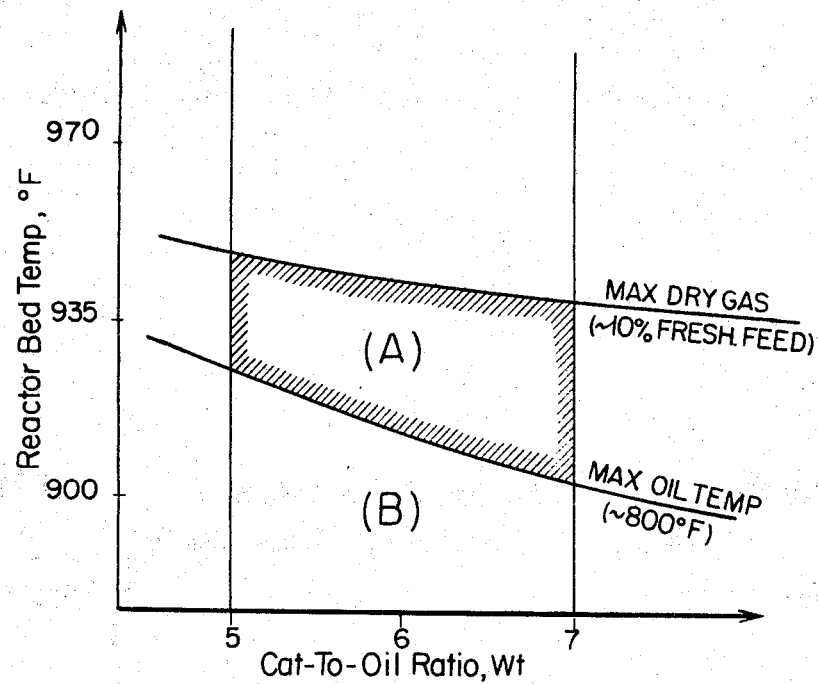

With reference to FIG. 3, the reactor temperature of 935° F. and the catalyst-to-oil ratio of 6 is an operating point in region (A) and is bounded by catalyst-to-oil ratios of 5 and 7, by a maximum dry gas yield of approximately 10% of fresh feed which is the gas plant capacity of the particular FCC system, and by a maximum allowable riser feed temperature of about 800° F. for the particular system provided by a reactor feed stock preheater. The simulation indicated that this region (A) provides reasonably good yields. FIG. 3 shows that advantages of "decoupled" operation in accordance with the present invention. By adding a regenerator air preheater, and by simultaneously increasing air temperature to the regenerator and decreasing the reactor feed stock temperature the region (B), below the maximum oil temperature isotherm between the catalyst-to-oil ratios by weight of 5 and 7, becomes operational for good yields while maintaining the catalyst-to-oil ratio held in region (A).

Figure 4:
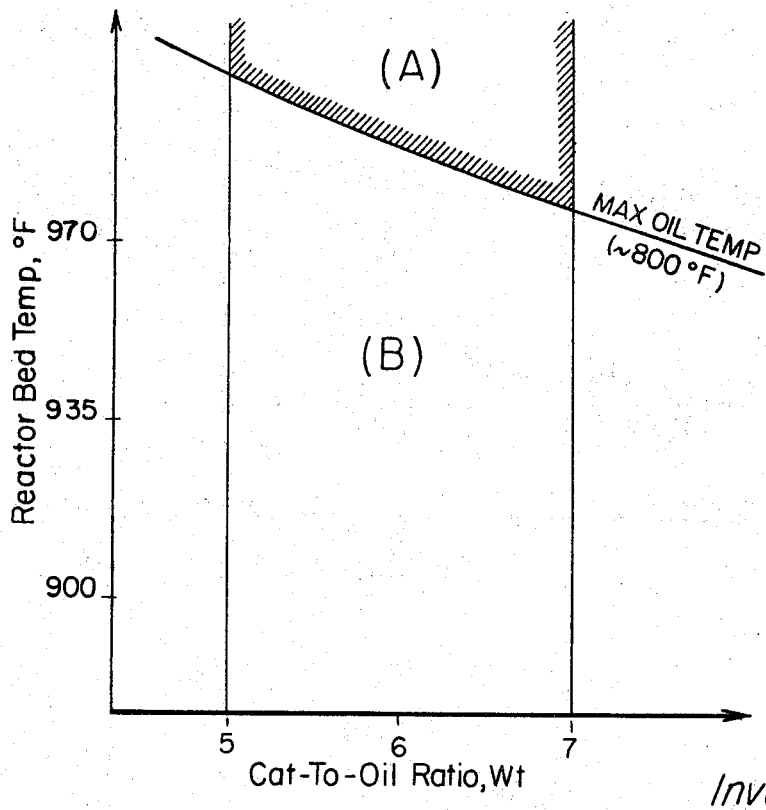

FIG. 4 demonstrates a more drastic example of a coke-deficient situation for the same FCC system illustrated in FIG. 3. The computer simulations included a light hydrogen pretreated gas oil feed stock and the same zeolite crystalline aluminosilicate catalyst used in FIG. 3. The most economical operational region with a feed preheater alone is designated in FIG. 4 as (A). However, this region is clearly impractical since the reactor temperature is too high with extremely high conversion or overcracking. However, by "decoupled" operation in accordance with the present invention to simultaneously manipulate the air preheat to the regenerator and to the feed stock preheat to the reactor, the area designated as (B) between the catalyst-to-oil ratios by weight of 5 and 7 becomes operational with reasonably good conversion and selectivity.

Thus, it is clear that "decoupled" operation in accordance with the present invention increases the feasible operating range and leads to more flexible operation.

In addition to "decoupled" operation in accordance with the present invention to provide an improved steady state optimum as demonstrated by the foregoing description with reference to FIGS. 2-4, dynamic control can also be improved by "decoupled" operation. For example, if a fluid catalytic cracking system has a constrained optimization policy with, for example, regenerator temperature constraining, independent adjustment of the air preheat will enable the regenerator to be held close to the constraint. Similarly, if the reactor temperature or conversion is constraining, a dynamic manipulation of the feed stock preheat temperature will lead to tighter control of the reactor at the constraint. Thus, the feed stock and air preheaters 12, 34 (FIG. 1) should be variable to allow for a range of control based on anticipated disturbances.

"Decoupled" operation in accordance with the present invention provides for increased flexibility of operation for widely different combinations of catalysts and feed stocks. For example, if the composition of the hydrocarbon feed stream to the reactor, or the composition of the active catalyst is changed, a predetermined catalyst circulation rate, and predetermined reactor and regenerated temperatures are generated in a computer such as 50 by manipulation of a model to provide a desired cracking severity. The set points of the level controller 27, the slide valve 40 and the temperature controllers 16, 32 are adjusted accordingly. The catalyst circulation rate is thereby adjusted to the generated predetermined catalyst circulation rate. The actual reactor and regenerator temperatures are compared with the respective generated predetermined reactor and regenerator temperatures in the temperature controllers 32, 16 to obtain reactor and regenerator temperature deviations. In response to the temperature deviations, the heater 34 and the heater 12 are simultaneously adjusted in directions to reduce the reactor and regenerator temperature deviations.

The catalyst circulation rate should be maintained at a predetermined high level to provide a predetermined cracking severity in the reactor 31. A predetermined cracking severity is a catalyst to oil ratio in the range of about 5 to about 20 by weight for a predetermined reactor temperature. The predetermined reactor temperature to provide the predetermined cracking severity can be in the range of about 900° F. to about 1050° F. The temperature of the hydrocarbon feed stream in the line 35 can be in the range of about 350° F. to about 800° F. The predetermined regenerator temperature can be in the range of about 1150° F. to about 1400° F.

"Decoupled" operation in accordance with the present invention provides for independent adjustment of the temperatures of the reactor 31 and the regenerator 15. As alternatives to controlling the regenerator temperature by manipulation of the air preheat, the temperature of the regenerator can be controlled by adjustment of the end point of the recycle oil from the fractionator, by adding a high-coke forming oil to the fresh hydrocarbon feed, by adjustment of the amount of steam to a stripper at the lower portion of the reactor 31, or by changing the catalyst composition.

Recycle oil can be combined with the fresh hydrocarbon feed either upstream or downstream of the heater 34. The end point of the recycle oil can be varied to adjust the amount of coke make in the reactor 31, and thus adjust the temperature of the regenerator 15. Specifically, an increase in the end point of the recycle oil causes an increase in coke make in the reactor 31 which, in turn, provides an increase in coke for combustion in the regenerator 15, thereby increasing the temperature of the regenerator 15. Conversely, a decrease in the end point of recycle gas will cause a decrease in the temperature of the regenerator 15.

A high coke forming oil can be added to the fresh hydrocarbon feed to adjust the amount of coke make in the reactor 31, and thus adjust the temperature of the regenerator 15. For example, a tank 60 of high coke forming oil has an output line 62 connected to the fresh hydrocarbon feed line 41, and a valve 61 is provided to control the flow rate of high coke forming oil from the tank 60 to the line 41. The valve 61 can be manually adjustable, or adjustable in response to an output signal (not shown) from the temperature controller 16. Further, the set point of the valve 61 can be changed in response to an output signal from the computer 50.

Situated in the lower portion of the reactor 31 is a stripper to which steam is applied by a line 63 to remove or strip hydrocarbons from the catalyst prior to the catalyst entering the transfer line 29. The amount of steam applied to the stripper is controllable by a valve 64. By increasing the amount of steam applied to the stripper, the amount of strippable hydrocarbon removal from the catalyst is increased to thereby decrease the amount of hydrocarbon on the catalyst supplied to the regenerator 15, and thus decrease the regenerator temperature. Conversely, a decrease in amount of steam applied to the stripper decreases the amount of strippable hydrocarbon removed from the catalyst, and thus increases the regenerator temperature. The valve 64 can be manually adjustable, or adjustable in response to an output signal from the temperature controller 16. Further, the set point of the valve 64 can be changed in response to an output signal from the computer 50.

The composition of the catalyst can be changed to control the regenerated temperature by changing the proportion of active catalyst and matrix. For example, an increase in the amount of zeolite on the matrix will increase the amount of coke make in the reactor 31 to thereby increase the amount of coke upon catalyst fed to the regenerator 15. As discussed above, an increase in coke fed to the regenerator 15 causes an increase in regenerator temperature. Conversely, a decrease in the amount of zeolite on the matrix will cause a decrease in the temperature of the regenerator.

Typical of the aluminosilicates which have a diminished amount of coke formed thereon, are those aluminosilicates, both natural and synthetic, which have a defined pore size of from 5 A. to 15 A. within an ordered internal structure. These aluminosilicates can be described as a three-dimensional framework of $SiO_4$ and $AlO_4$ tetrahedra in which the tetrahedra are crosslinked by the sharing of oxygen atoms whereby the ratio of the total aluminum and silicon atoms to oxygen atoms is 1:2. In their hydrated form, the aluminosilicates, may be represented by the following formula:

$$M_{2/n}O:Al_2O_3 \cdot wSiO_2 \cdot yH_2O$$

wherein M is a cation which balances the electrovalence of the tetrahedra, $n$ represents the valence of the cation, $w$ the moles of $SiO_2$, and $y$ the moles of $H_2O$. The cation can be any one or more of a number of metal or organic ions depending on whether the aluminosilicate is synthesized or occurs naturally. Typical cations include sodium, lithium, potassium, calcium tetramethylammonium and the like. Although the proportions of inorganic oxides in the silicates and their spatial arrangement may vary, effecting distinct properties in the aluminosilicate, the two main characteristics of these materials is the presence in their molecular structure of at least 0.5 equivalent of an ion of positive valence per gram atom of aluminum, and an ability to undergo dehydration without substantially effecting the $SiO_4$ and $AlO_4$ framework.

One of the crystalline aluminosilicates which tends to minimize coke formation is the synthetic faujasite designated as zeolite X and described in U.S. 2,882,244. Zeolite X is commercially available in both the sodium and the calcium forms. Another such crystalline aluminosilicate is zeolite Y described in U.S. 3,130,007.

It will be appreciated that other aluminosilicates are contemplated as having low coke forming tendencies. A criterion for such catalyst is that its ordered internal structure must have defined pore sizes of sufficient diameters to allow entry of the preselected reactants and the emergence of the desired reaction products. Naturally occurring crystalline aluminosilicates can be employed if they have a pore size such as to admit the material to be cracked.

A contemplated catalyst is the rare earth exchanged zeolite X which has a high concentration of hydrogen sites. This catalyst is also prepared from the sodium form of zeolite X, as the result of a conventional treatment involving partial replacement of the sodium by contact with a fluid medium containing cations of at least one of the rare earth metals. Any medium which will ionize the cations without affecting the crystalline structure of the zeolite may be employed. After such treatment the resulting exchanged product is water washed, dried, and dehydrated. The dehydration thereby produces the characteristic system of open pores, passages, or a cavity of crystalline aluminosilicate.

As a result of the above treatment, the rare earth exchanged aluminosilicate is an activated crystalline catalyst material in which the molecular structure has been changed by having metallic rare earth cations and hydrogen cations chemisorbed or ionically bonded thereto. Because specific rare earth metal cations as well as a mixture of several different rare earth metal cations may be base exchanged with the aluminosilicate, the concentration of hydrogen cations sites produced within the catalyst may vary depending on the completeness of the exchange as well as the rare earth cations employed. Thus, it has been found that the rare earth exchanged zeolite X catalyst useful in this invention may contain from about 0.5 to about 1.0 milliequivalent of hydrogen per gram of solid catalyst. Furthermore, it will be appreciated that the defined pore size of the rare earth exchanged zeolite X may vary from about 6 A., generally from 6 A. to 15 A., and preferably in the approximate range of 10 A. to 15 A. in diameter.

Advantageously, the rare earth cations can be provided from the salt of a single metal or preferably mixture of metals such as a rare earth chloride or didymium chlorides. Such mixtures are usually introduced as a rare earth chloride solution which, as used herein, has reference to a mixture of rare earth chlorides consisting essentially of the chlorides of lanthanum, cerium, praseodymium, and neodymium, with minor amounts of samarium, and yttrium. This solution is commercially available and contains the chlorides of a rare earth mixture having the relative composition cerium (as $CeO_2$) 48% by weight, lanthanum (as $La_2O_3$) 24% by weight, praseodymium (as $Pr_6O_{11}$) 5% by weight, neodymium (as $Nd_2O_3$) 17% by weight, samarium (as $Sm_2O_3$) 3% by weight gadolinium (as $Gd_2O_3$) 2% by weight, yttrium (as $Y_2O_3$) 0.2% by weight, and other rare earth oxides 0.8% by weight. Didymium chloride is also a mixture of rare earth chlorides, but having a low cerium content. It consists of the following rare earths determined as oxides: lanthanum, 45–56% by weight; cerium, 1–2% by weight; praseodymium, 9–10% by weight; neodymium, 32–33% by weight; samarium, 5–6% by weight; gadolinium, 3–4% by weight, yttrium, 0.4% by weight; other rare earths 1–2% by weight.

It will be appreciated that zeolite X may also be base exchanged with the rare earth metal cations followed by additional exchange with a fluid medium containing hydrogen cations or a compound convertible to hydrogen cations such as ammonium chloride. The resulting rare earth hydrogen exchanged zeolite X will also serve as an effective acid catalyst material; one difference being that its concentration of hydrogen sites will be greater than the above-described zeolite X catalyst material.

It will also be appreciated that cations of polyvalent metals other than the rare earths may be employed to replace the exchangeable cations from the aluminosilicates to provide effective catalysts for this process; those having a valence of three or more being preferred for preparation of high concentration of acid sites. Exemplary of such metals are the lower valence metals, silver, cobalt, nickel, zinc, and the higher valence metals, vanadium, chromium, manganese, iron and the like. However, the chemical properties of the metal, i.e., its atomic radius, degree or ionization, hydrolysis constant and the like, will determine its suitability for exchange with a particular aluminosilicate. In addition, metals such as calcium, magnesium, and the like, may be used with ammonium chloride or similar ammonium compounds to produce aluminosilicate catalysts for this invention by conventional base exchange techniques; the ammonium cations being decomposed to form sites by heating of the exchanged aluminosilicate to drive off ammonia.

Other contemplated catalysts can be prepared from zeolite Y. Thus, zeolite Y may be further activated by the same base exchange techniques employed for the rare earth exchanged zeolite X catalyst. It has been found that the exchange of rare earth cations for the sodium cations within zeolite Y produces a highly active acid catalyst. However, because of the high acid stability produced by a high silicon to aluminum ratio, the preferred acid form of zeolite Y is prepared by partially replacing the sodium cations with hydrogen cations. This replacement may be accomplished by treatment with a fluid medium containing hydrogen cations, and/or cations capable of conversion to hydrogen cations. Inorganic and organic acids represent the source of hydrogen cations, whereas ammonium compounds are representatives of the cations capable of conversion to hydrogen ions. It will be appreciated that the fluid medium may contain a hydrogen cation, an ammonium cation or a mixture thereof, in a pH range from about 1 to about 12.

The aluminosilicate catalyst may be employed directly as a catalyst or it may be combined with a suitable support or binder. The particular chemical composition of the latter is not critical. It is, however, necessary that the support or binder employed be thermally stable under the conditions at which the conversion reaction is carried out. Thus, it is contemplated that solid porous adsorbents, carriers and supports, of the type heretofore employed in catalytic operations may feasibly be used in combination with the crystalline aluminosilicate. Such materials may be catalytically inert or may possess an intrinsic catalytic activity or an activity attributable to close association or reaction with the crystalline aluminosilicate. Such materials include by way of examples, dried inorganic oxides, gels and gelatinous precipitates of alumina, silica, zirconia, magnesia, thoria, titania, boria and combinations of these oxides with one another and with other components. Other suitable supports include activated charcoal, mullite, kieselguhr, bauxite, silicon, carbide, sintered alumina and various clays. These supported crystalline aluminosilicates may feasibly be prepared as described in U.S. 3,224,643 issued Apr. 5, 1966 to Albert B. Schwartz by growing crystals of the aluminosilicate in the pores of the support. Also, the aluminosilicate may be intimately composited with a suitable binder, such as inorganic oxide hydrogel or clay, for example, by ball milling the two materials together over an extended period of time, preferably in the presence of water, under conditions to reduce the particle size of the aluminosilicate to a weight mean particle diameter of less than 40 microns and preferably less than 15 microns. Also, the aluminosilicate may be combined with and distributed throughout a gel matrix by dispersing the aluminosilicate in powdered form in an inorganic oxide hydrosol. In accordance with this procedure, the finely divided aluminosilicate may be dispersed in an already prepared hydrosol or, as is preferable, where the hydrosol is characterized by a short time of gelation, the finely divided aluminosilicate may be added to one or more of the reactants used in forming the hydrosol or may be admixed in the form of a separate stream with streams of the hydrosol-forming reactants in a mixing nozzle or other means where the reactant are brought into intimate contact. The powder-containing inorganic oxide hydrosol sets to a hydrogel after lapse of a suitable period of time and the resulting hydrogel may thereafter, if desired, be exchanged to introduce selected ions into the aluminosilicate and then dried and calcined.

The inorganic oxide gel employed, as described above as a matrix for the metal aluminosilicate, may be a gel of any hydrous inorganic oxide, such as, for example, aluminous of siliceous gels. While alumina gel or silica gel may be utilized as a suitable matrix, it is preferred that the inorganic oxide gel employed be a cogel of silica, and an oxide of at least one metal selected from the group consisting of metals of Groups II–A, II–B, and IV–A of the Periodic Table. Such components include for example, silica-alumina, silica-magnesia, silica-zirconia, silica-thoria, silica-beryllia, silica-titania as well as ternary combinations such as silica-alumina-thoria, silica-alumina-zirconia, silica-alumina-magnesia, and silica-magnesia-zirconia. In the foregoing gels, silica is generally present as the major component and the other oxides of metals are present in minor proportion. Thus, the silica content of such gels is generally within the approximate range of 55 to 100 weight percent with the metal oxide content ranging from zero to 45 weight percent. The inorganic oxide hydrogels utilized herein and hydrogels obtained therefrom may be prepared by a method well-known in the art, such as for example, hydrolysis of ethyl orthosilicate, acidification of an alkali metal silicate and salt of a metal the oxide of which it is desired to cogel with silica, etc. The relative proportions of finely divided crystalline aluminosilicate and inorganic oxide gel matrix may vary widely with the crystalline aluminosilicate content from about 2 to about 90 percent by weight.

What is claimed is:

1. In a method of controlling a fluid catalytic process for the conversion of a hydrocarbon feed stream, wherein said stream is contacted with an active catalyst in a reactor maintained under catalytic conversion conditions to provide reaction products which are removed from said reactor, the catalyst in said reactor becoming contaminated by the deposition of coke thereon, wherein the contaminated catalyst is circulated from said reactor through a regenerator having a dense bed phase at the lower portion thereof where said coke is burned with the evolution of a flue gas by contact with an oxygen-containing gas supplied to the regenerator by an oxygen-containing gas stream to thereby regenerate the catalyst and elevate the regenerator temperature and the temperature of the regenerated catalyst before returning the regenerated catalyst to said reactor, and wherein the catalyst in said dense bed phase is fluidized by said oxygen-containing gas passing upwardly through said dense bed phase, the steps comprising:

maintaining a predetermined catalyst circulation rate to said reactor to provide a predetermined cracking severity in said reactor, controlling the amount of heat supplied to said regenerator to maintain the carbon content on the recirculating catalyst at an optimum level, and simultaneously changing the temperature of said feed stream by an amount which compensates for the varying recirculating catalyst temperature so as to maintain a predetermined reactor temperature.

2. The method of claim 1 wherein said reactor temperature is adjusted by changing the temperature of said hydrocarbon feed stream to maintain said predetermined reactor temperature.

3. The method of claim 1 wherein the amount of heat supplied to said regenerator is adjusted by controlling the temperature of the oxygen-containing gas stream to maintain a predetermined regenerator temperature.

4. The method of claim 2 wherein a recycle oil from a fractionator is combined with said hydrocarbon feed stream, and wherein said regenerator temperature is adjusted by controlling the composition of said recycle oil to maintain a predetermined regenerator temperature.

5. The method of claim 2 wherein a recycle oil from a fractionator is combined with said hydrocarbon feed stream, and wherein the end point of said recycle oil is controlled to maintain a predetermined regenerator temperature.

6. The method of claim 2 wherein said regenerator temperature is adjusted by adding a variable amount of high-coke forming oil to said hydrocarbon feed stream to maintain a predetermined regenerator temperature.

7. The method of claim 1 wherein said regenerator temperature is adjusted by changing the composition of said catalyst to provide a predetermined regenerator temperature.

8. The method of claim 1 wherein said generator temperature is adjusted by controlling the temperature of the oxygen-containing gas stream to maintain a predetermined regenerator temperature.

9. The method of claim 1 wherein a recycle oil from a fractionator is combined with said hydrocarbon feed stream, and wherein said regenerator temperature is adjusted by controlling the composition of said recycle oil to maintain a predetermined regenerator tempeature.

10. The method of claim 1 wherein a recycle oil from a fractionator is combined with said hydrocarbon feed stream, and wherein the end point of said recycle oil is controlled to maintain a predetermined regenerator temperature.

11. The method of claim 1 wherein said regenerator temperature is adjusted by adding a variable amount of high-coke forming oil to said hydrocarbon feed stream to maintain a predetermined regenerator temperature.

12. The method of claim 1 wherein said regenerator temperature is adjusted by changing the composition of said catalyst to provide a predetermined regenerator temperature.

13. In a method of controlling a fluid catalytic process for the conversion of a hydrocarbon feed stream, wherein said stream is contacted with an active catalyst in a reactor maintained under catalytic conversion conditions to provide reaction products which are removed from said reactor, the catalyst in said reactor becoming contaminated by the deposition of coke thereon, and wherein the contaminated catalyst is circulated from said reactor through a regenerator having a dense bed phase at the lower portion thereof where said coke is burned with the evolution of a flue gas by contact with an oxygen-containing gas supplied to the regenerator by an oxygen-containing gas stream to thereby regenerate the catalyst and elevate the regenerator temperature and the temperature of the regenerated catalyst before returning the regenerated catalyst to said reactor, and wherein the catalyst in said dense bed phase is fluidized by said oxygen-containing gas passing upwardly through said dense bed phase, the step comprising:

maintaining a predetermined catalyst circulation rate to said reactor to provide a predetermined cracking severity in said reactor, setting a predetermined regenerator temperature at a level which maintains the carbon content on the recirculating catalyst at an optimum level, comparing an actual regenerator temperature with said predetermined regenerator temperature to obtain a regenerator temperature deviation, adjusting the temperature of the oxygen-containing gas stream to said regenerator in a direction to reduce said regenerator temperature deviation, simultaneously changing a predetermined reactor temperature by an amount which compensates for the varying recirculating catalyst temperature, comparing an actual reactor temperature with said predetermined reactor temperature to obtain a reactor temperature deviation, and adjusting the temperature of said hydrocarbon feed stream in a direction to reduce said reactor temperature deviation.

14. The method of claim 13 wherein said predetermined cracking severity is a predetermined catalyst to oil ratio at a given reactor temperature.

15. The method of claim 13 wherein said active catalyst is a crystalline aluminosilicate.

16. The method of claim 13 wherein said active catalyst is a rare earth exchanged zeolite Y crystalline aluminosilicate.

17. The method of claim 13 wherein said active catalyst is a rare earth exchanged zeolite X crystalline aluminosilicate.

18. The method of claim 14 wherein said predetermined catalyst to oil ratio is in the range of about 5 to about 20 by weight.

19. The method of claim 13 wherein said predetermined reactor temperature is in the range of about 900° F. to about 1050° F.

20. The method of claim 13 wherein said predetermined regenerator temperature is in the range of about 1150° F. to about 1400° F.

21. The method of claim 13 wherein the temperature of said hydrocarbon feed stream is in the range of about 350° F. to about 800° F.

22. The method of claim 13 wherein said predetermined cracking severity is a predetermined catalyst to oil ratio in the range of about 5 to 20 by weight at said predetermined reactor temperature.

23. The method of claim 15 wherein said crystalline aluminosilicate is combined with a porous inorganic oxide matrix.

24. In a method of controlling a fluid catalytic process for the conversion of a hydrocarbon feed stream, wherein said stream is contacted with an active catalyst in a reactor maintained under catalytic conversion conditions to provide reaction products which are removed from said reactor, the catalyst in said reactor becoming contaminated by the deposition of coke thereon, and wherein the contaminated catalyst is circulated from said reactor through a regenerator having a dense bed phase at the lower portion thereof where said coke is burned with the evolution of a flue gas by contact with an oxygen-containing gas supplied to the regenerator by an oxygen-containing gas stream to thereby regenerate the catalyst and elevate the temperature of the regenerated catalyst before returning the regenerated catalyst to said reactor, and wherein the catalyst in said dense bed phase is fluidized by said oxygen-containing gas passing upwardly through said dense bed phase, the steps comprising:

generating a predetermined catalyst circulation rate, a predetermined reactor temperature and a predetermined regenerator temperature to provide a predetermined cracking severity with the changed stream or catalyst, maintaining said predetermined catalyst circulation rate, comparing an actual reactor temperature with said predetermined reactor temperature to obtain a reactor temperature deviation, comparing an actual regenerator temperature with said predetermined regenerator temperature to obtain a regenerator temperature deviation, and simultaneously adjusting the temperature of said hydrocarbon feed stream in a direction to reduce said reactor temperature deviation and the temperature of the oxygen containing gas stream in a direction to reduce said regenerator temperature deviation.

25. The method of claim 24 wherein said predetermined catalyst circulation rate provides a catalyst to oil ratio of at least 5 by weight.

26. The method of claim 24 wherein said active catalyst is a crystalline aluminosilicate.

27. The method of claim 24 wherein said active catalyst is rare earth exchanged zeolite Y crystalline aluminosilicate.

28. The method of claim 24 wherein said active catalyst is a rare earth exchanged zeolite X crystalline aluminosilicate.

29. The method of claim 25 wherein said predetermined catalyst circulation rate is at least approximately the maximum catalyst circulation rate permitted by the physical limitations of the process.

30. The method of claim 26 wherein said predetermined reactor temperature is in the range of about 900° F. to about 1050° F.

31. The method of claim 26 wherein said predetermined regenerator temperature is in the range of about 1150° F. to about 1400° F.

32. The method of claim 26 wherein said generating step provides a minimized amount of coke on regenerated catalyst.

33. The method of claim 26 wherein the temperature of said hydrocarbon feed stream is in the range of about 350° F. to about 800° F.

34. The method of claim 26 wherein said predetermined cracking severity is a predetermined catalyst to oil ratio in the range of about 5 to 20 by weight at said predetermined reactor temperature.

35. In a system for controlling a fluid catalytic process for the conversion of a hydrocarbon feed stream, wherein said stream is contacted with an active catalyst in a reactor maintained under catalytic conversion conditions to provide reaction products which are removed from said reactor, the catalyst in said reactor becoming contaminated by the deposition of coke thereon, and wherein the contaminated catalyst is circulated from said reactor through a regenerator having a dense bed phase at the lower portion thereof where said coke is burned with the evolution of a flue gas by contact with an oxygen-containing gas supplied to the regenerator by an oxygen-containing gas stream to thereby regenerate the catalyst and elevate the temperature of the regenerated catalyst returning the regenerated catalyst to said reactor, and wherein the catalyst in said dense bed phase is fluidized by said oxygen-containing gas passing upwardly through said dense bed phase, the combination comprising:

means for maintaining a predetermined catalyst circulation rate to said reactor to maintain a predetermined cracking severity in said reactor, means for setting a predetermined regenerator temperature at a level which maintains the carbon content on the recirculating catalyst at an optimum level, means for comparing an actual regenerator temperature with said predetermined regenerator temperature to obtain a regenerator temperature deviation, means for simultaneously adjusting the temperature of said oxygen-containing gas stream to said regenerator in a direction to reduce said regenerator temperature deviation, means for setting a predetermined reactor temperature at a level which compensates for the varying recirculating catalyst temperature, means for comparing an actual reactor temperature with said predetermined reactor temperature to obtain a reactor temperature deviation, and means for adjusting the temperature of said hydrocarbon feed stream in a direction to reduce said reactor temperature deviation.

36. The system of claim 35 wherein said predetermined cracking severity is a predetermined catalyst to oil ratio at said predetermined reactor temperature.

37. The system of claim 35 wherein said active catalyst is a crystalline aluminosilicate combined with a porous inorganic oxide matrix.

38. The system of claim 35 wherein said active catalyst is a rare earth exchanged zeolite Y crystalline aluminosilicate.

39. The system of claim 35 wherein said active catalyst is a rare earth exchanged zeolite X crystalline aluminosilicate.

40. The system of claim 35 wherein said hydrocarbon feed stream temperature adjusting means includes means for heating said hydrocarbon feed stream.

41. The system of claim 35 wherein said oxygen-containing gas stream temperature adjusting means includes means for heating said oxygen-containing gas stream.

42. The system of claim 36 wherein said predetermined catalyst to oil ratio is at least 5 by weight.

43. The system of claim 35 wherein said predetermined reactor outlet temperature is in the range of about 900° F. to about 1050° F.

44. The system of claim 35 wherein said predetermined regenerator temperature is in the range of about 1150° F. to about 1400° F.

45. The system of claim 35 wherein the temperature of said hydrocarbon feed stream is in the range of about 350° F. to about 800° F.

46. The system of claim 35 wherein said predetermined cracking severity is a predetermined catalyst to oil ratio in the range of about 5 to 20 by weight at said predetermined reactor temperature.

References Cited

UNITED STATES PATENTS

| | | | |
|---|---|---|---|
| 2,327,175 | 8/1943 | Conn | 208—164 |
| 2,367,694 | 1/1945 | Snuggs | 208—164 |
| 2,379,027 | 6/1945 | Monro | 208—164 |
| 3,161,583 | 12/1964 | Pohlenz | 208—164 |
| 3,175,968 | 3/1965 | Berger | 208—164 |
| 3,513,087 | 5/1970 | Smith | 208—164 |

HERBERT LEVINE, Primary Examiner

U.S. Cl. X.R.

208—DIG. 1; 23—288 S